US010165223B2

(12) United States Patent
Liu et al.

(10) Patent No.: US 10,165,223 B2
(45) Date of Patent: Dec. 25, 2018

(54) PRE-SELECTABLE VIDEO FILE PLAYBACK SYSTEM AND METHOD, AND COMPUTER PROGRAM PRODUCT

(71) Applicant: VIVOTEK INC., New Taipei (TW)

(72) Inventors: Chien-Wen Liu, New Taipei (TW); Po-Chun Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 2 days.

(21) Appl. No.: 15/347,531

(22) Filed: Nov. 9, 2016

(65) Prior Publication Data

US 2017/0150092 A1    May 25, 2017

(30) Foreign Application Priority Data

Nov. 20, 2015  (TW) .............................. 104138648 A

(51) Int. Cl.
*H04N 5/915* (2006.01)
*G06T 7/00* (2017.01)
*G11B 27/00* (2006.01)

(52) U.S. Cl.
CPC .......... *H04N 5/915* (2013.01); *G06T 7/0022* (2013.01); *G11B 27/005* (2013.01); *G06T 2207/10016* (2013.01); *G06T 2207/20228* (2013.01)

(58) Field of Classification Search
CPC .............................. H04N 5/915; G06T 7/0022
See application file for complete search history.

(56) References Cited

U.S. PATENT DOCUMENTS

| 2006/0164702 | A1* | 7/2006 | Shiiyama | G06F 17/30843 358/537 |
| 2009/0013001 | A1* | 1/2009 | Park | G06F 17/30058 |
| 2010/0192099 | A1* | 7/2010 | Takagi | G09G 5/14 715/828 |
| 2011/0064381 | A1* | 3/2011 | Circlaeys | G11B 27/28 386/241 |

FOREIGN PATENT DOCUMENTS

TW    200824433    6/2008

* cited by examiner

*Primary Examiner* — Thai Q Tran
*Assistant Examiner* — Girumsew Wendmagegn
(74) *Attorney, Agent, or Firm* — Andrew M. Calderon; Roberts Mlotkowski Safran Cole & Calderon, P.C.

(57) ABSTRACT

A pre-selectable video file playback system and method, and a computer program product are provided. Multiple first images are captured from multiple frame images in a first time interval, and two chronological first images thereafter are compared sequentially. A next first image is selected if the next first image is substantially different from a previous first image, and the next first image is not selected if the next first image is substantially the same as the previous first image. By displaying the selected first images, the number of images that users watch may be reduced.

17 Claims, 5 Drawing Sheets

PRE-SELECTABLE VIDEO FILE PLAYBACK SYSTEM AND METHOD, AND COMPUTER PROGRAM PRODUCT

CROSS-REFERENCE TO RELATED APPLICATION

This non-provisional application claims priority under 35 U.S.C. § 119(a) to Patent Application No. 104138648 filed in Taiwan, R.O.C. on Nov. 20, 2015, the entire contents of which are hereby incorporated by reference.

BACKGROUND

Technical Field

The present invention relates to a video file playback system, and particularly to a pre-selectable video file playback system and method, and a computer program product.

Related Art

Nowadays, in order to prevent crime or traffic violations, cameras are often installed in places such as shops, streets, and roads, to facilitate continuous video monitoring. When an important event takes place, a recorded file can be played back, to view an image picture at the time of the event. However, if the parties concerned do not know the occurrence time of the event, lots of time and energy have to be spent in finding the image picture at the time of the event, and the scene can be restored correctly. Particularly, image scenes not at the time of the event often do not change greatly; therefore, the image pictures not at the time of the event have extremely high similarity, the parties can correctly compare different image pictures only by spending lots of energy in comparing the image pictures one by one; however, this will often let the parties dazzle, which costs lots of effort.

SUMMARY

In view of the above problems, embodiments of the present invention propose a pre-selectable video file playback system and method, and a computer program product, which may compare multiple chronological image pictures in advance, automatically screen out image pictures having different content for users to browse, and may significantly save the time and energy that the users need to spend.

The pre-selectable video file playback system includes a storage unit, a processing unit and a display unit. The storage unit stores a video file which includes multiple frame images arranged in an order of generation time. The processing unit is electrically connected with the storage unit, and captures multiple first images from the frame images in a first time interval. The processing unit further sequentially compares two chronological first images. A next first image is selected if the next first image is substantially different from a previous first image; and the next first image is not selected if the next first image is substantially the same as the previous first image. The display unit is electrically connected with the processing unit, for displaying the selected first images.

The pre-selectable video file playback method may be applied to a monitoring system, including: reading a video file which includes multiple frame images arranged in an order of generation time; capturing multiple first images from the multiple frame images in a first time interval; sequentially comparing two chronological first images, selecting a next first image if the next first image is substantially different from a previous first image, and not selecting the next first image if the next first image is substantially the same as the previous first image; and displaying the selected first images.

The computer program product can accomplish the pre-selectable video file playback method described above after being loaded and executed by a computer.

Through the pre-selectable video file playback system and method, and the computer program product described above, images having different contents are compared and selected at first, and the selected images are displayed in a more prominent manner than unselected images, to reduce users' opportunity of watching repeated pictures, which may reduce the users' burden of browsing video files and may speed up the browsing.

DETAILED DESCRIPTION

Figure 1:
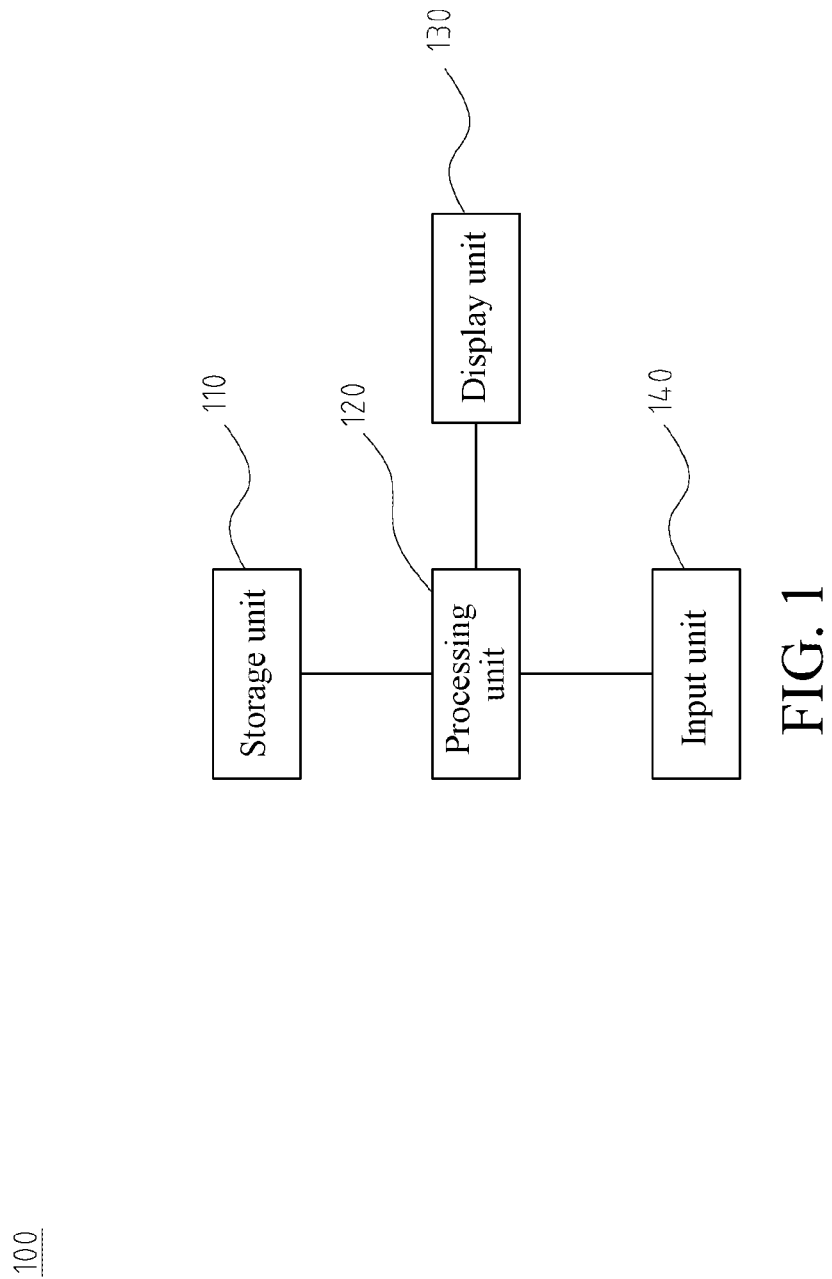
FIG. 1 is a schematic block diagram of a pre-selectable video file playback system according to an embodiment of the present invention.

Referring to FIG. 1, it is a schematic block diagram of a pre-selectable video file playback system 100 (hereinafter referred to as "video file playback system") according to an embodiment of the present invention. The video file playback system 100 includes a storage unit 110, a processing unit 120 and a display unit 130. The display unit 130 is electrically connected with the processing unit 120, and the processing unit 120 is electrically connected with the storage unit 110. The storage unit 110 may be a storage medium such as a hard disk, a non-volatile memory (e.g., EEPROM) or a memory card (e.g., SD card). The display unit 130 may be a display such as a cathode-ray tube display or a liquid crystal display or an image output display device such as a projector. The processing unit 120 is a processor having computational capability, such as a micro-processor, a Complex Programmable Logic Device (CPLD) or a Field-Programmable Gate Array (FPGA). The video file playback system 100 may substantially be achieved with a computer mainframe (e.g., a computer system based on an x86 architecture) or an embedded host (e.g., an embedded system based on an advanced RISC machine (ARM), System-on-Chip (SoC) or digital signal processor (DSP) architecture).

The storage unit 110 is used to store a video file. The video file includes multiple frame images arranged in an order of generation time. The format of the video file may be Audio Video Interleave (AVI), Moving Pictures Experts Group (MPEG), MOV, WMV, FLV or the like. In some embodiments, the video file playback system 100 may further include a photographing unit (not shown) disposed in a desired position, used to capture images to generate the video file. The photographing unit may be linked with the processing unit 120 and the storage unit 110 in wired and wireless manners. The processing unit 120 may store a video file generated by the photographing unit in the storage unit 110, thus generating the video file including multiple frame images arranged in an order of generation time. When the photographing unit is linked with the processing unit 120 and the storage unit 110 in wired and wireless manners, the video file playback system 100 has to further include a wireless communication unit (not shown) electrically connected with the processing unit, used to conduct wireless communication with the photographing unit to receive the video file.

The processing unit 120 may capture multiple first images from the frame images in a first time interval. The first images may be at intervals of a same time. For example, in a 24-h video file, a frame image is captured as first images every 1 hour. The frame image is an image having substantial image data content. Next, the processing unit 120 may sequentially compare two chronological first images. A next first image is selected if the next first image is substantially different from a previous first image; and the next first image is not selected if the next first image is substantially the same as the previous first image. That is to say, suppose that there are four first images, the first one is substantially different from the other three ones following it, and the three ones are all substantially the same, the first one of the other three ones is substantially different from the one before it, and thus the first one may be selected, but the second one and the third one of the other three ones may not be selected because they are respectively substantially the same as the one before them (that is, the second one of the four ones is the same as the third one of the four ones; the third one of the four ones is the same as the fourth one of the four ones). It should be also noted that, in an embodiment, as the first one in all the first images has no comparison objects, the first one may definitely be selected; however, in another embodiment, the first one in all the first images may not be selected. The display unit 130 may display all the selected first images. Thus, the video file playback system 100 may present different first images, which avoids presenting too many identical or similar pictures and may reduce the users' burden of browsing the images. It must be emphasized that two chronological first images may be first images having chronological times and may also be lots of first images at intervals of a same time selected and arranged in a certain searching manner, and the chronological first images in such embodiments may not substantially have chronological times.

Herein, whether two chronological first images are substantially the same may be judged according to value variation or brightness variation of corresponding pixels between the two chronological first images. That is to say, if the value variation or brightness variation exceeds a default value, the two chronological first images are determined to be substantially different; on the contrary, they are determined to be substantially the same. The value variation may be variation of gray-scale values of the pixels or color separation value variation. For example, in terms of an RGB color mode, it may be variation of red light values of the pixels, variation of green light values of the pixels, variation of blue light values of the pixels or variation of a combination thereof. However, the embodiments of the present invention are not limited thereto, and in the case of a CMYK color mode, total pixel variation may also be, for example, variation of cyan light values of the pixels. In another embodiment, whether two chronological first images are substantially the same may also be judged according to differences and similarities of gray-scale values of pixels between the two chronological first images.

Figure 2:
FIG. 2 is a schematic diagram of a screening picture according to an embodiment of the present invention.

Referring to FIG. 2, it is a schematic diagram of a screening picture according to an embodiment of the present invention; in the picture, 24 first images 210 are presented. The processing unit 120 may further perform additional shielding, brightness reduction or other image processing on unselected first images 210a, enabling the users to differentiate selected first images 210b and 210b' from the unselected first images 210a. Therefore, in addition to displaying the selected first images 210b and 210b', the display unit 130 further displays the unselected first images 210a after additional shielding, brightness reduction or other display-weakening image processing. In this way, the display unit 130 may display the selected first images 210b and 210b' in a more prominent manner than the unselected first images 210a, enabling the users to see different first images 210b and 210b' more intuitively and easily. In another embodiment, it is also possible to adopt a manner of increasing brightness of the selected first images 210b and 210b', adding an outline border outside images or other display-strengthening image processing manners, which also enables the users to differentiate selected first images 210b and 210b' from the unselected first images 210a. The manner in which the display unit 130 may display the selected first images 210b and 210b' in a more prominent manner than the unselected first images 210a is not limited to the above embodiment.

In another embodiment, the display unit 130 displays the selected first images 210b and 210b' in a rolling manner. That is to say, the display unit 130 displays the selected first images 210b and 210b' sequentially in a manner as playing back slides, and each of the first images 210b and 210b' may be played for a predetermined time length (e.g., 3 seconds). As only the selected first images 210b and 210b' are displayed in a rolling manner, an effect may also be achieved that the display unit 130 may display the selected first images 210b and 210b' in a more prominent manner than the unselected first images 210a, making the users only focus on browsing different first images 210b and 210b'.

Referring to FIG. 1 again, the video file playback system 100 may further include an input unit 140 electrically connected with the processing unit 120. The input unit 140 may be a mouse, a keyboard, a touch screen or the like, and the input unit 140 is used to receive an input of a user. As shown in FIG. 2, the user may operate the input unit 140 to specify one of the first images 210b' in a first time interval. By taking that the input unit 140 is a mouse, the user operates the mouse to click a left button at the first image 210b', and the first image 210b' can be specified. The processing unit 120 determines a second time interval according to the selected first image 210b' and a subsequent first image 210b. On the basis of the previous example, as the selected first image 210b' and the subsequent first image 210b are at an interval of one hour, the second time interval in this example is one hour. The processing unit 120 will capture multiple second images in the second time interval as second images (for example, it captures a second image every 5 minutes). Next, as the processing on the first image 210 described previously, the processing unit may compare two chronological second images sequentially. A next first image is selected if the next first image is substantially different from a previous first image; and the next first image is not selected if the next first image is substantially the same as the previous first image.

The display unit 130 is further used to display the selected second images. The manner of displaying the second images may be the same as the manner in FIG. 2, in which the selected second images and unselected second images after additional shielding, brightness reduction or other display-weakening image processing are displayed; or the unselected second images and the selected second images after brightness increase, addition of an outline border outside images or other display-strengthening image processing. Alternatively, only the selected second images are displayed in a rolling manner. In the above manner, the user may gradually reduce a time range and find an image at a desired time point. In addition, the processing unit 120 may further select a first second image and display the first second image via the display unit 130.

The user determines a second time interval according to the selected first image 210b' and a subsequent first image 210b to display the second images via the input unit; in addition to this, in another embodiment, the input unit 130 may also receive an input of the user to specify one of the selected first images 210b and 210b'. The processing unit 120 may load (i.e., play) at least one frame image corresponding to the specified first image 210b' in the first time interval in response to the input of the user. The display unit 130 displays the loaded frame image. Herein, the frame image corresponding to the specified first image 210b or 210b' may be one or more frame images behind the specified first image 210b or 210b', or one or more frame images before the specified first image 210b or 210b'. Thus, the user may directly browse the frame images before or behind the specified first image 210b or 210b'. For example, when the user specifies the first image 210b' via the input unit 140, the processing unit 120 may, in response to the input of the user, control the display unit 130 to play the multiple frame images one by one sequentially arranged in an order of generation time from the specified first image 210b' according to the time order until the next first image 210b. In another embodiment, the playback may also start from first several frame images prior to the time point of the first image 210b'. In addition, in another embodiment, the processing unit 120 may also, in response to the input of the user, control the display unit 130 to zoom in the specified first image 210b', enabling the user to clearly watch the first image 210b'. The above implementation of displaying or playing images may be set according to the user's demand, and is not limited to the above embodiment.

Figure 3:
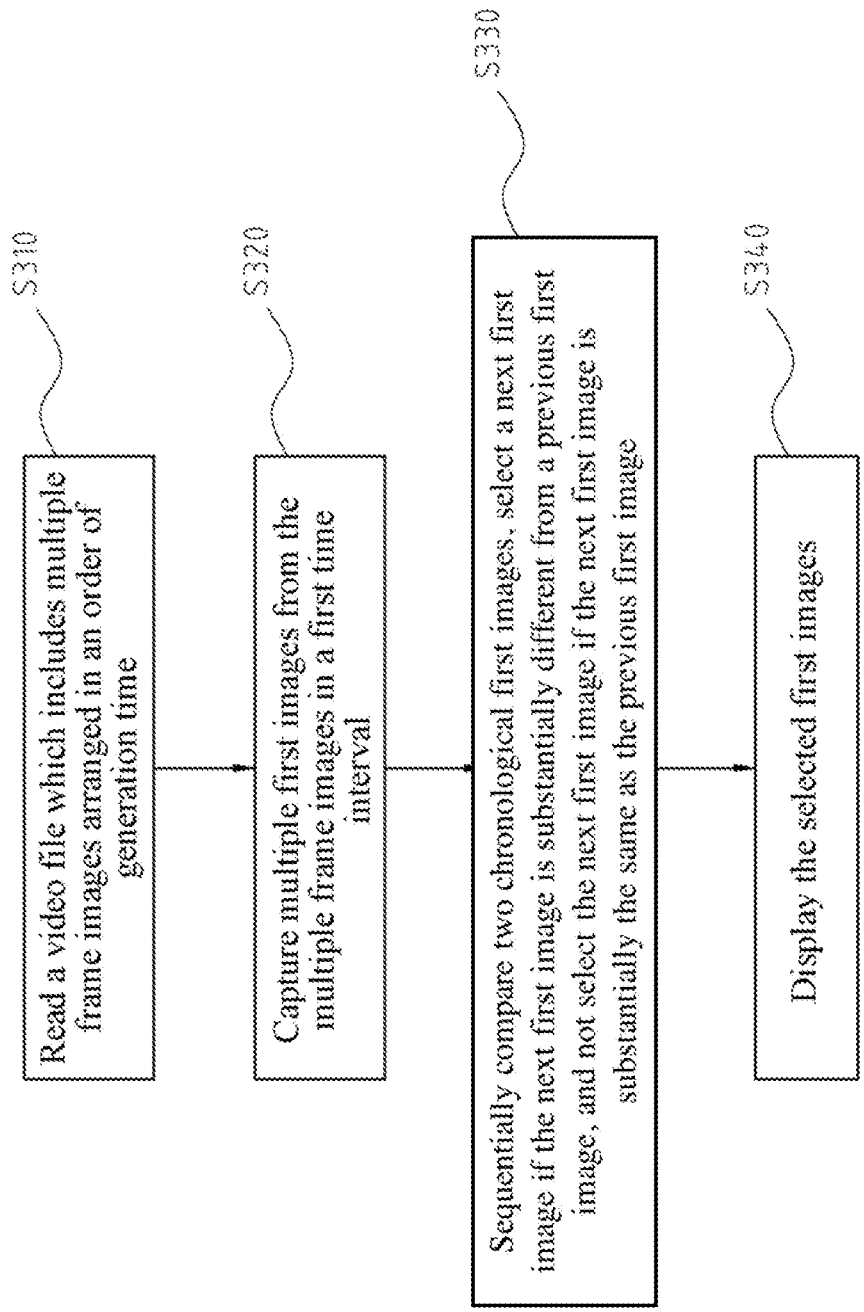
FIG. 3 is a flowchart of a pre-selectable video file playback method according to an embodiment of the present invention.

Referring to FIG. 3, it is a flowchart of a pre-selectable video file playback method according to an embodiment of the present invention, which may be applied to a monitoring system and may be performed by the video file playback system 100. The storage unit 110 of the computer mainframe may store a computer program product, and after the processing unit 120 of the computer mainframe loads the computer program product, the method as shown in FIG. 3 may be performed. Firstly, a video file is read, which includes multiple frame images arranged in an order of generation time (step S310), wherein the frame images are image pictures having substantial image data content. Next, multiple first images 210 are captured from the multiple frame images in a first time interval (step S320). In step S330, two chronological first images 210 are sequentially compared, a next first image is selected if the next first image is substantially different from a previous first image, and the next first image is not selected if the next first image is substantially the same as the previous first image. Finally, in step S340, the selected first images 210 are displayed.

In an embodiment, step S330 further includes selecting the first one of the first images and step S340 further includes displaying the selected first first image.

In an embodiment, in step S340, the selected first images 210b are displayed in a more prominent manner than the unselected first images 210a.

In an embodiment, in step S340, the unselected first images 210a may be additionally shielded at first, and then the unselected first images 210a additionally shielded are displayed.

In an embodiment, in step S340, only the selected first images 210b are played in a rolling manner.

In an embodiment, after step S340, an input may be received, which specifies one of the selected first images 210b, and next, at least one frame image (for example, the frame image in a later time period or the frame image starting from a previous time period) corresponding to the specified first image 210b' in the first time interval is loaded (i.e., played) in response to the input.

Figure 4:
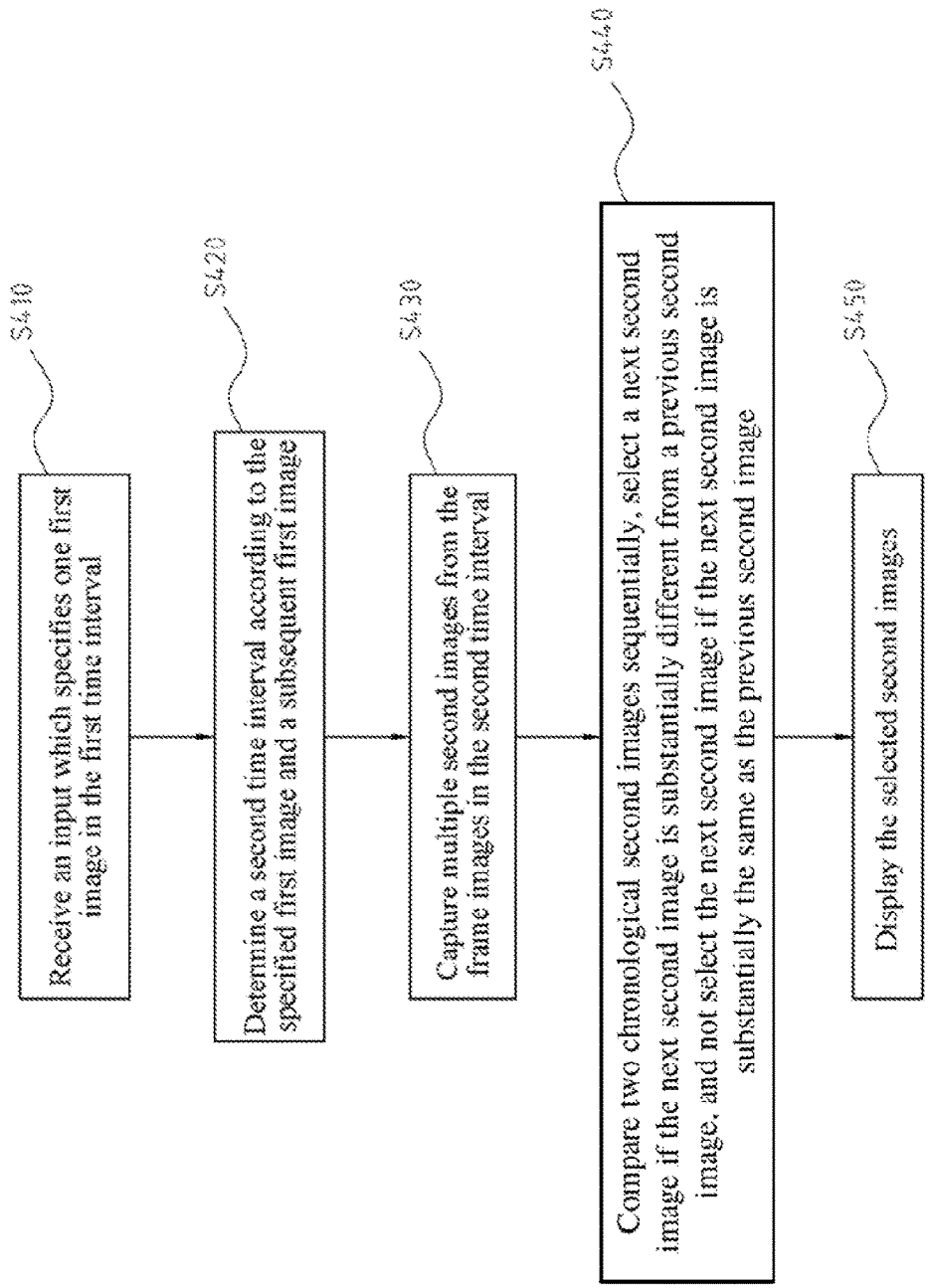
FIG. 4 is another flowchart of a pre-selectable video file playback method according to an embodiment of the present invention.

Referring to FIG. 4, it is another flowchart of a pre-selectable video file playback method according to an embodiment of the present invention. The pre-selectable video file playback method according to the present invention, after step S340, may further include the following steps. Firstly, in step S410, an input which specifies one first image 210b' in the first time interval is received. Next, in step S420, a second time interval according to the specified first image 210b' and a subsequent first image 210b is determined. In step S430, multiple second images from the frame images in the second time interval are captured. Next, two chronological second images are compared sequentially, a next second image is selected if the next second image is substantially different from a previous second image, and the next second image is not selected if the next second image is substantially the same as the previous second image (step S440). Finally, in step S450, the selected second images are displayed. In an embodiment, step S440 further includes selecting a first second image, and step S450 further includes displaying the selected first second image.

Figure 5:
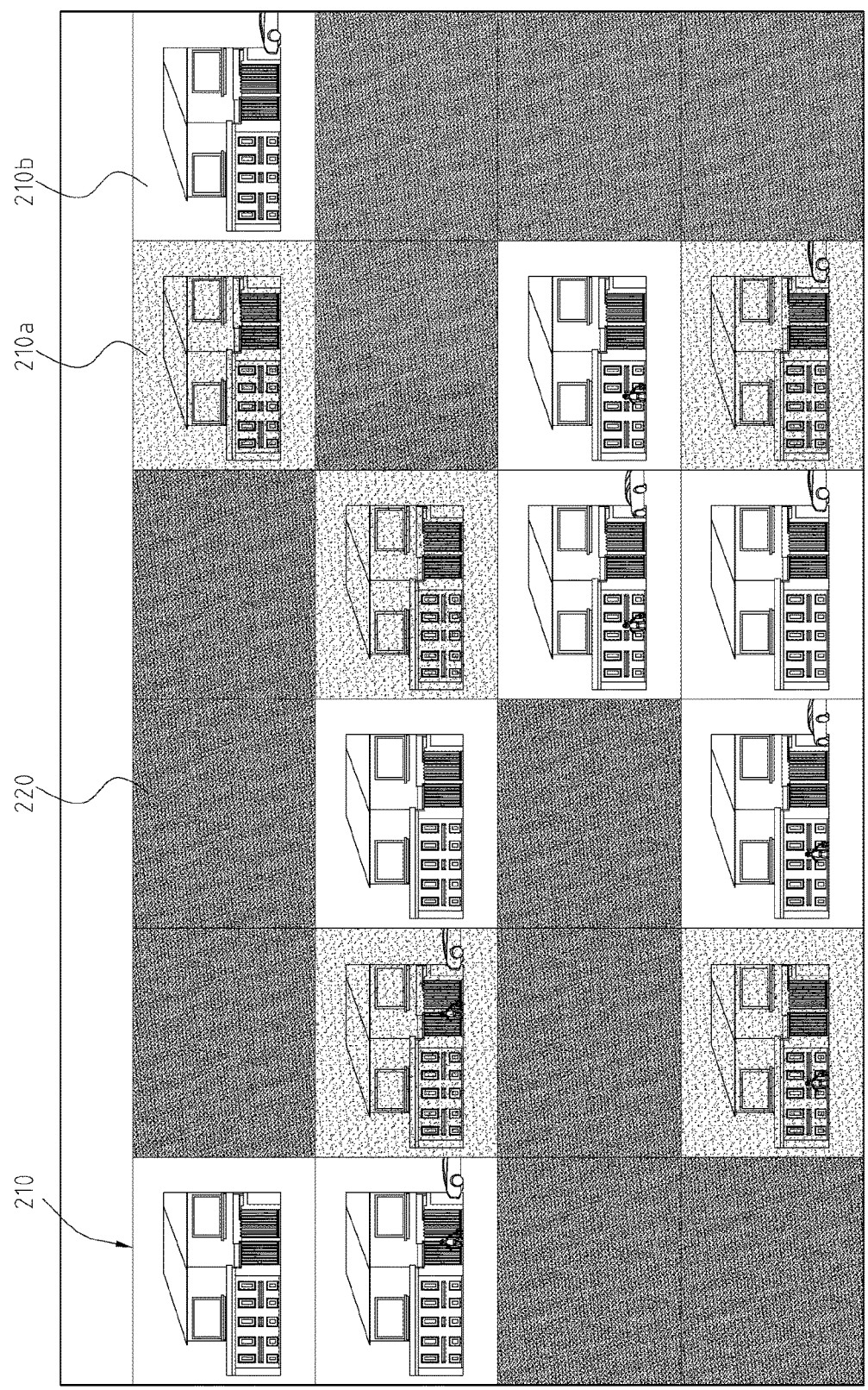
FIG. 5 is a schematic diagram of a screening picture according to another embodiment of the present invention.

Referring to FIG. 5, it is a schematic diagram of a screening picture according to another embodiment of the present invention. Herein, it should be noted that the first image 210 or the second image refers to an image (frame image) having substantial image data content. Under some circumstances, due to a camera or image transmission line fault and other reasons, some image pictures may have no image data content (hereinafter referred to as "fault images" 220), and at this point, commonly known black pictures may be displayed on the back-end display unit 130. Therefore, in step S330 or step S440, when comparison is made, the fault images 220 have to be excluded. As the example shown in FIG. 5, there are three fault images 220 behind the first one of the first images 210. Therefore, in step S330, comparison may not be made between the three fault images 220 and the first one of the first images but be made between a first image 210a behind the three fault images 220 and the first one of the first images 210. Therefore, the two first images 210 and 210a are substantially the same, and thus the first image 210a may not be selected.

To sum up, the pre-selectable video file playback system and method, and the computer program product proposed in the embodiments of the present invention may actively compare and filter the same image pictures, and find image pictures having different content, enabling the users to quickly and accurately find different images, and, in addition, further making the user focus on browsing the different images more intuitively by displaying the image pictures compared and selected in a more prominent manner, which can significantly save the time and energy of finding and browsing the video file.

What is claimed is:

1. A pre-selectable video file playback system, comprising:
   a storage unit storing a video file which comprises multiple frame images arranged in an order of generation time;
   a processing unit electrically connected with the storage unit, capturing multiple first images from the multiple frame images in a first time interval, sequentially comparing two chronological first images, selecting a next first image if the next first image is substantially different from a previous first image, and not selecting the next first image if the next first image is substantially the same as the previous first image;
   a display unit electrically connected with the processing unit, for displaying the selected first images; and
   an input unit receiving an input which specifies one first image in the first time interval;
   wherein the processing unit further determines a second time interval according to the selected first images and a subsequent first image and captures multiple second images from the frame images in the second time interval, the processing unit further compares two chronological second images sequentially, selects a next second image if the next second image is substantially different from a previous second image, and does not selects the next second image if the next second image is substantially the same as the previous second image, and the display unit is further used for displaying the selected second images.

2. The pre-selectable video file playback system according to claim 1, wherein the processing unit further selects the first one of the multiple first images, and the display unit is further used to display the first one of the multiple first images.

3. The pre-selectable video file playback system according to claim 1, wherein the display unit is used to display the selected first images in a more prominent manner than the unselected first images.

4. The pre-selectable video file playback system according to claim 1, wherein the display unit displays the selected first images in a rolling manner.

5. The pre-selectable video file playback system according to claim 1, further comprising:
   an input unit receiving an input which specifies one of the selected first images;
   wherein the processing unit loads at least one frame image corresponding to the specified first image in the first time interval in response to the input; and
   the display unit is used to display the loaded at least one frame image.

6. The pre-selectable video file playback system according to claim 1, wherein the processing unit, in the first time interval, captures the frame image as the first image at intervals of a same time.

7. A pre-selectable video file playback method, applied to a monitoring system, the video file playback method comprising:
   reading a video file which comprises multiple frame images arranged in an order of generation time;
   capturing multiple first images from the multiple frame images in a first time interval;
   sequentially comparing two chronological first images, selecting a next first image if the next first image is substantially different from a previous first image, and not selecting the next first image if the next first image is substantially the same as the previous first image;
   displaying the selected first images;
   receiving an input which specifies one first image in the first time interval;
   determining a second time interval according to the specified first image and a subsequent first image;
   capturing multiple second images from the frame images in the second time interval;
   comparing two chronological second images sequentially, selecting a next second image if the next second image is substantially different from a previous second image, and not selecting the next second image if the next second image is substantially the same as the previous second image; and
   displaying the selected second images.

8. The pre-selectable video file playback method according to claim 7, further comprising: selecting the first one of the multiple first images and displaying the first one of the multiple first images.

9. The pre-selectable video file playback method according to claim 7, wherein the selected first images displayed are displayed in a more prominent manner than the unselected first images.

10. The pre-selectable video file playback method according to claim 7, wherein the selected first images displayed are displayed in a rolling manner.

11. The pre-selectable video file playback method according to claim 7, further comprising:
    receiving an input which specifies one of the selected first images; and
    loading at least one frame image corresponding to the specified first image in the first time interval in response to the input.

12. The pre-selectable video file playback method according to claim 7, wherein the multiple first images are images having data content.

13. The pre-selectable video file playback method according to claim 7, wherein the step of capturing multiple first images from the frame images in a first time interval is, in the first time interval, capturing the frame image as the first image at intervals of a same time.

14. A computer program product, which is stored on a non-transitory storage medium and can accomplish a pre-selectable video file playback method after a computer loads and executes the computer program, the video file playback method comprising:
    reading a video file which comprises multiple frame images arranged in an order of generation time;
    capturing multiple first images from the multiple frame images in a first time interval;
    sequentially comparing two chronological first images, selecting a next first image if the next first image is substantially different from a previous first image, and not selecting the next first image if the next first image is substantially the same as the previous first image;
    displaying the selected first images;
    receiving an input which specifies one first image in the first time interval;
    determining a second time interval according to the specified first image and a subsequent first image;
    capturing multiple second images from the frame images in the second time interval;
    comparing two chronological second images sequentially, selecting a next second image if the next second image is substantially different from a previous second image, and not selecting the next second image if the next second image is substantially the same as the previous second image; and displaying the selected second images.

15. The computer program product according to claim 14, further comprising:

selecting the first one of the multiple first images and displaying the first one of the multiple first images.

16. The computer program product according to claim 14, further comprising:

receiving an input which specifies one of the selected first images; and loading at least one frame image corresponding to the specified first image in the first time interval in response to the input.

17. The computer program product according to claim 14, wherein the step of capturing multiple first images from the frame images in a first time interval is, in the first time interval, capturing the frame image as the first image at intervals of a same time.

* * * * *